(12) United States Patent
Madinger et al.

(10) Patent No.: US 12,698,994 B2
(45) Date of Patent: Aug. 4, 2026

(54) METHOD FOR OPERATING AN ULTRASONIC FLUID METER, AND ULTRASONIC FLUID METER

(71) Applicant: Diehl Metering GmbH, Ansbach (DE)

(72) Inventors: Andreas Madinger, Ansbach (DE); Florian Herrmann, Langfurth (DE); Philip Wolf, Nuremberg (DE)

(73) Assignee: Diehl Metering GmbH, Ansbach (DE)

( * ) Notice: Subject to any disclaimer, the term of this patent is extended or adjusted under 35 U.S.C. 154(b) by 296 days.

(21) Appl. No.: 18/632,359

(22) Filed: Apr. 11, 2024

(65) Prior Publication Data

US 2024/0255329 A1 Aug. 1, 2024

Related U.S. Application Data

(63) Continuation of application No. PCT/EP2022/080599, filed on Nov. 2, 2022.

(30) Foreign Application Priority Data

Nov. 9, 2021 (DE) ..................... 10 2021 129 096.1

(51) Int. Cl.
  *G01F 1/667* (2022.01)
  *E03B 7/07* (2006.01)
(52) U.S. Cl.
  CPC .............. *G01F 1/667* (2013.01); *E03B 7/072* (2013.01)
(58) Field of Classification Search
  CPC ........ G01F 1/667; G01F 1/668; G01F 15/024; G01F 1/662; E03B 7/072
  See application file for complete search history.

(56) References Cited

U.S. PATENT DOCUMENTS

| | | | | |
|---|---|---|---|---|
| 11,635,317 B2 * | 4/2023 | Neder | ..................... | G01S 7/521 |
| | | | | 702/54 |
| 2008/0066557 A1 * | 3/2008 | Yoshida | ................... | G01F 1/86 |
| | | | | 73/861.27 |
| 2017/0350865 A1 | 12/2017 | Kretzler et al. | | |

FOREIGN PATENT DOCUMENTS

| | | | |
|---|---|---|---|
| DE | 10062875 A1 | 7/2002 | |
| DE | 102012022376 A1 | 5/2014 | |
| DE | 102014119512 A1 | 6/2016 | |
| DE | 202020003345 U1 | 9/2020 | |
| EP | 1243901 A1 | 9/2002 | |
| EP | 3199932 A1 | 8/2017 | |

(Continued)

*Primary Examiner* — Tarun Sinha
(74) *Attorney, Agent, or Firm* — Laurence A. Greenberg; Werner H. Stemer; Ralph E. Locher

(57) ABSTRACT

A method for operating an ultrasonic fluid meter, preferably an ultrasonic water meter, in a fluid line network, at a measuring rate with one measuring interval, includes generating an ultrasonic signal at specific time points by an ultrasonic converter, the ultrasonic signal passing through a measuring section, and the fluid flow volume being ascertained by an electronic analysis unit based on propagation time and/or a propagation time difference of the ultrasonic signal. The hydraulic force exerted onto the ultrasonic converter by a flow event via the fluid or a change in the hydraulic force is detected by the ultrasonic converter and evaluated in the electronic analysis unit. As a result, the measuring rate is adaptively modified to ascertain the flow volume of fluid and/or the flow volume ascertained over a measuring interval is corrected based on the temporal position of the flow event relative to the measuring interval.

20 Claims, 7 Drawing Sheets

(56)                References Cited

FOREIGN PATENT DOCUMENTS

| GB | 2146122 | A | 4/1985 |
| JP | 2002236040 | A | 8/2002 |

* cited by examiner

METHOD FOR OPERATING AN ULTRASONIC FLUID METER, AND ULTRASONIC FLUID METER

CROSS-REFERENCE TO RELATED APPLICATION

This application is a continuation, under 35 U.S.C. § 120, of copending International Patent Application PCT/EP2022/080599, filed Nov. 2, 2022, which designated the United States; this application also claims the priority, under 35 U.S.C. § 119, of German Patent Application DE 10 2021 129 096.1, filed Nov. 9, 2021; the prior applications are herewith incorporated by reference in their entirety.

FIELD AND BACKGROUND OF THE INVENTION

The present invention relates on the one hand to a method for operating an ultrasonic fluid meter, preferably an ultrasonic water meter, in a fluid line network with a measurement rate, including a measurement interval, wherein an ultrasound signal is generated at particular instants by an ultrasound transducer and travels along a measurement section, and the flow volume of fluid is ascertained by evaluation electronics on the basis of the time of flight and/or a time of flight difference of the ultrasound signals. The present invention relates on the other hand to an ultrasonic fluid meter, preferably an ultrasonic water meter, for installation in a fluid line network, including a measurement tube housing, at least one ultrasound transducer for emitting and/or receiving an ultrasound signal, which travels along a measurement section, an electronics module, which contains control and evaluation electronics for controlling the operation and for evaluating the received ultrasound signal, a battery, and a data interface for data export.

Ultrasonic fluid meters are used to determine the flow of fluid in a fluid line network, for example in a water line network. In a fluid line network, the fluid is under pressure. A flow measurement, or fluid volume flow measurement, takes place on the basis of measuring the time of flight of an ultrasound signal transmitted through the fluid. The time of flight is in this case measured once in the flow direction and once counter to the flow direction. The fluid flow or fluid volume flow can be determined from the time of flight difference. Ultrasonic fluid meters are usually supplied with electrical energy by a battery. The battery capacity of such a battery covers the complete service life of the ultrasonic fluid meter in the field. The service life of an ultrasonic fluid meter is usually in a range of from 12 to 16 years. Since each measurement requires energy, because of the limited battery capacity it is necessary to adjust the measurement rate or the measurement interval, that is to say the temporal spacing between two neighboring measurement points, so that the service life is achieved. The fluid flow is usually measured at fixed time spacings, i.e. with a constant measurement rate, and the volume respectively metered at the discrete measurement instant is interpolated between the measurement instants. In the case of a static flow profile, this is not particularly detrimental since it has only a minor influence on the volume result. In the case of a dynamic flow profile, however, the method leads to inaccuracies since flow changes are identified too late. There is therefore a tradeoff between the limited battery capacity of an ultrasonic fluid meter, on the one hand, and the requirement for a maximally accurate volume flow measurement, which represents even dynamic flow profiles, on the other hand.

European Patent Application EP 3 199 932 A1 discloses a battery-powered consumption meter for recording the energy consumption of a fluid delivered to a customer, which includes a flow measuring device for measuring the flow and a temperature measuring device for measuring the entry and exit temperatures. With this flow meter, the measurement rate of the temperature measurements is increased if the flow changes. A delayed fluid temperature change, combined with a change in the flow rate, may thereby be recorded more accurately and the energy consumed may consequently be measured more accurately.

SUMMARY OF THE INVENTION

It is accordingly an object of the invention to provide a method for operating an ultrasonic fluid meter, and an ultrasonic fluid meter, which overcome the hereinafore-mentioned disadvantages of the heretofore-known methods and meters of this general type and which allow a higher measurement accuracy with energy-saving operation.

With the foregoing and other objects in view, in accordance with the invention, the hydraulic force or hydraulic force change exerted by a flow event on the ultrasound transducer, that is to say the piezoceramic, via the fluid is detected by the ultrasound transducer, evaluated in the evaluation electronics and, as a function thereof, the measurement rate, that is to say the temporal spacing of neighboring measurement points, for ascertaining the flow volume of fluid is adaptively modified. In this way, it becomes possible to record dynamic flow conditions substantially more accurately. The method according to the invention furthermore makes it possible to reduce the measurement rate in comparison with the conventional method at times of static flow conditions, for example at times when no fluid is being consumed. Consequently, despite an increased measurement accuracy under dynamic flow conditions, energy-saving operation may nevertheless be ensured and thus an increase of the service life may still be achieved. At the same time, the hydraulic force or hydraulic force change may be recorded by the ultrasound transducer which is present in any case on an ultrasonic flow meter. Additional sensors do not need to be used. The method may therefore be implemented particularly economically and efficiently since it is merely necessary for the evaluation electronics, or the relevant operating software, to be adapted accordingly. Alternatively or in addition, according to the invention the flow volume ascertained over a measurement interval is corrected on the basis of the temporal location of the flow event in relation to the measurement interval. This makes it possible to identify a flow change within the measurement interval and make an accurate time assignation of, for example, when the fluid consumption began in the measurement interval. The measurement accuracy may thereby additionally be increased.

Expedient configurations of the method according to the invention are claimed in the associated dependent claims.

Expediently, the hydraulic force or hydraulic force change exerted by the flow event on the ultrasound transducer via the fluid is detected as an electrical voltage occurring at the ultrasound transducer, or piezoceramic, or as an electrical voltage change occurring at the ultrasound transducer (or piezoceramic). The force changes on the piezo crystal of the ultrasound transducer lead to a change of the electrical voltage at the ultrasound transducer and can thus be detected.

The method according to the invention also makes it possible to establish the direction of the force change by detecting whether the electrical voltage change occurring at the ultrasound transducer is positive or negative, i.e. whether it is increasing or decreasing. If a stopcock in the fluid line network is closed, for example, this leads to a pressure increase, i.e. to a positive change of the electrical voltage. If a stopcock is opened, for example, this leads to a pressure reduction and therefore to a negative change of the electrical voltage occurring at the ultrasound transducer. By the method according to the invention, for example, it is therefore possible to establish that a stopcock has been closed and/or opened.

Preferably, the method according to the invention also makes it possible to evaluate the voltage profile which occurs in the event of a force change. This is made possible in particular by constant observation of the voltage profile at the piezoceramic. The nature of the event causing the hydraulic change may be deduced from the voltage profile.

The method also makes it possible that the evaluation electronics of the ultrasonic fluid meter can be parameterized as a function of the force change, preferably as a function of the established direction of the force change. If example a positive force change is detected (because the stopcock has been closed), this may be used in the evaluation electronics as a parameter for switching to a low measurement rate. In the event of detecting a negative force change, on the other hand (a stopcock being opened), the negative force change or the voltage change resulting therefrom may be established as a parameter in the evaluation electronics in order to increase the measurement rate.

The flow event may expediently be the actuation of a stopcock and/or of a valve, preferably full or partial closure or full or partial opening of a stopcock and/or the valve, and/or a pump activity.

According to a further configuration of the present invention, a hydraulic force or hydraulic force change may respectively be stored as a comparative value, preferably in the ultrasonic fluid meter or assigned to the ultrasonic meter, preferably in a head end, and may be compared by the evaluation electronics with measurement values generated during operation of the ultrasonic fluid meter. The head end is, for example, a logical node or a central data management.

For example, a first and a second measurement rate are provided, the measurement interval for the second measurement rate being greater than for the first measurement rate and switching from the first to the second measurement rate or vice versa taking place as a function of the detected hydraulic force or hydraulic force change.

The second measurement rate may in this case be significantly greater than a hitherto conventional measurement rate, and the first measurement rate may be significantly lower than the hitherto usual measurement rate. This is particularly advantageous since the measurement rate may be made substantially smaller than previously at times of static flow conditions so that the battery of the ultrasonic fluid meter is conserved.

Expediently, a third measurement rate which is not equal to the first and second measurement rates is provided after the detection of a flow event. The third measurement rate includes in particular measurement bursts, i.e. a plurality of measurements which are carried out in a short time interval. Preferably, only a previously limited number of measurements are taken at the third measurement rate, and/or they are taken in a limited time interval, for example in a time interval in the range of seconds. With the third measurement rate, a change of the flow volume can be determined particularly precisely.

Advantageously, the third measurement rate is higher than the first measurement rate and/or the second measurement rate.

Expediently, switching to the first measurement rate or to the second measurement rate takes place after the measurements with the third measurement rate as a function of the detected hydraulic force or hydraulic force change. Since the third measurement rate has a high energy requirement, energy can be saved by switching to the first measurement rate or second measurement rate.

According to one expedient configuration, the measurement interval may be adapted algorithmically in the scope of the adaptive change of the measurement rate for ascertaining the flow volume of fluid. In this way, the flow measurement may additionally be adapted to the actual situation of the dynamic flow conditions.

In the method according to the invention, the following data may preferably be generated in addition:
the frequency of flow events and/or
the instants of flow events and/or
the time profile of flow events and/or
the temporal spacing of preferably neighboring flow events.

At least one of the aforementioned quantities may respectively be used as an input variable for the algorithm.

Expediently, the flow volume is interpolated between the measurements. Despite this interpolation, a substantially higher accuracy is achieved because of the change of the measurement rate as a function of the recorded flow events.

By recording a flow event within a measurement interval, the interpolation may preferably take place as a function of the temporal location of the flow event within the measurement interval.

Further, the remaining residual capacity of the battery of the ultrasonic fluid meter may jointly be taken into account when establishing the modification of the measurement rate, preferably in such a way that the ultrasonic fluid meter adapts its measurement rate so that it can still continue to be operated until a firmly predefined total operating duration (for example 12 years). In the case of a relatively low residual capacity of the battery, this may lead under "normal operating conditions" to a premature end of the service life, although the latter may be prevented by the measures described above.

With the objects of the invention in view, there is concomitantly provided an ultrasonic fluid meter, preferably an ultrasonic water meter, in which the ultrasonic fluid meter or its electronics module is operated by a method according to the invention.

Other features which are considered as characteristic for the invention are set forth in the appended claims.

Although the invention is illustrated and described herein as embodied in a method for operating an ultrasonic fluid meter, and an ultrasonic fluid meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figures 1, 2:
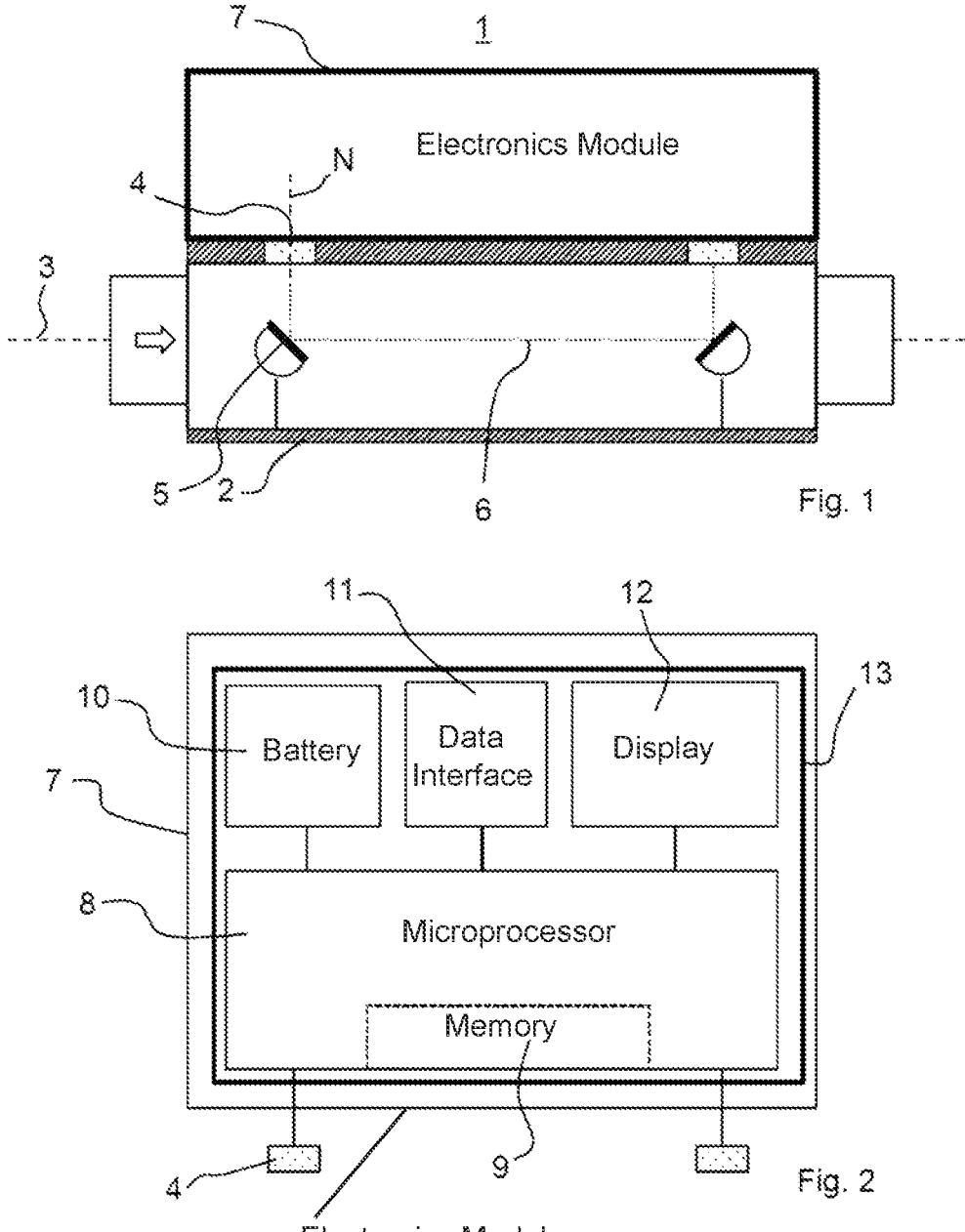
FIG. 1 is a simplified, diagrammatic, longitudinal-sectional view of an ultrasonic fluid meter for applying the method according to the invention.
FIG. 2 is a block diagram of an example of the structure of the electronics module of an ultrasonic fluid meter.

Referring now to the figures of the drawings in detail and first, particularly, to FIG. 1 thereof, there is seen an ultrasonic fluid meter 1, for example a water meter, which has a housing, for example a measurement tube housing 2, that is installed in a fluid line network 3, for example a supply line for cold or hot water. The ultrasonic fluid meter 1 has for example two ultrasound transducers 4, of which one ultrasound transducer is disposed closer to the entry (see the arrow in FIG. 1) than the other ultrasound transducer. The ultrasound transducers 4 are located for example in a bore of the wall of the measurement tube housing 2 and are oriented with their respective surface normal N perpendicular to the flow direction of the fluid inside the measurement tube housing 2.

Each ultrasound transducer 4 includes a piezoelectric element in the form of a piezoceramic platelet, which is provided on both sides along its main faces with electrodes (not represented in FIG. 1), which are wired in an electronics module 7 that is located on the upper side of the measurement tube housing 2. The piezoceramic platelets may in this case be exposed directly to the fluid or, alternatively, coated with a very thin protective layer which transmits the hydraulic force onto the piezoceramic platelet.

Inside the measurement tube housing 2, there are two reflectors 5 which are intended respectively to deflect an ultrasound signal (ultrasound burst) emitted by the ultrasound transducer 4 in the longitudinal direction of the measurement tube housing 2, or respectively to deflect it from the longitudinal direction of the measurement tube housing 2 back toward the receiving ultrasound transducer. The measurement section 6 of the example of the ultrasonic fluid meter as shown in FIG. 1 is U-shaped. It may however also have other shapes, for example a W-shape or double W-shape, in which more than two deflections respectively take place, or more reflectors 5 are provided. By emitting ultrasound signals both in and counter to the flow direction, so long as the fluid is flowing through the measurement tube housing 2, the flow volume may be deduced with the aid of the time of flight difference thereby induced for the ultrasound signal in the flow direction and counter to the flow direction.

FIG. 2 shows a highly simplified schematic representation of the important functional elements of the electronics module 7 of an ultrasonic flow meter 1. The electronics module 7 includes a printed circuit board 13 having a microprocessor 8 with a memory 9. A battery 10, which ensures the service life of the ultrasonic flow meter in the field, is further provided. Such ultrasonic flow meters are constructed for a service life of at least 12 years, so that the battery 10 must ensure the function of the ultrasonic flow meter 1 over this long period of time. There may furthermore be a display 12 on the ultrasonic flow meter. The data generated by the ultrasonic flow meter are output via a data interface 11. This is generally a radio interface which makes it possible to transmit consumption data and/or further operational data to an external data logger (not represented) and/or to receive data transmitted from the data logger. The data logger may either be fixed in position or mobile. The data of the ultrasonic flow meter 1 are usually transmitted further from the data logger to a head end (likewise not represented). The evaluation of the data takes place in the head end.

Figure 3:
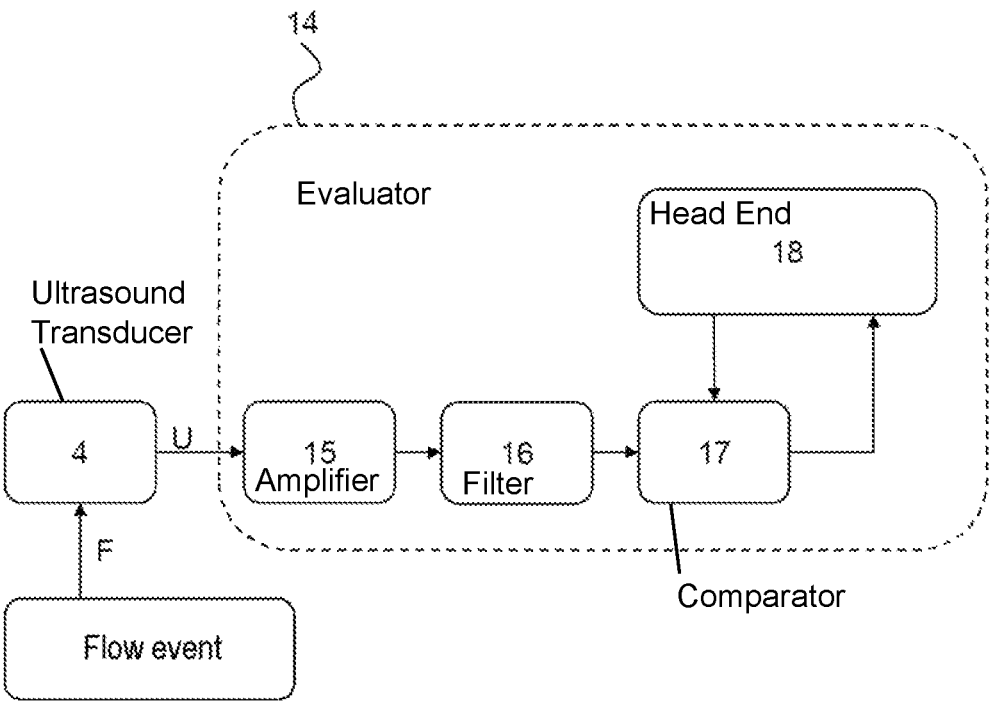
FIG. 3 is a block diagram of an exemplary method sequence.

According to the invention, the measurement rate of the flow measurement is adaptively adapted with the aid of detected changes of the flow conditions in the ultrasonic flow meter 1, or the measurement tube housing 2 of the latter, as shown by way of example by the block diagram of FIG. 3. The changes of the flow conditions are detected here by using the ultrasound transducer 4, specifically in the form of a mechanical force or force change or hydraulic force or hydraulic force change which occurs because of the respectively changing flow conditions at the ultrasound transducer 4.

Figure 4:
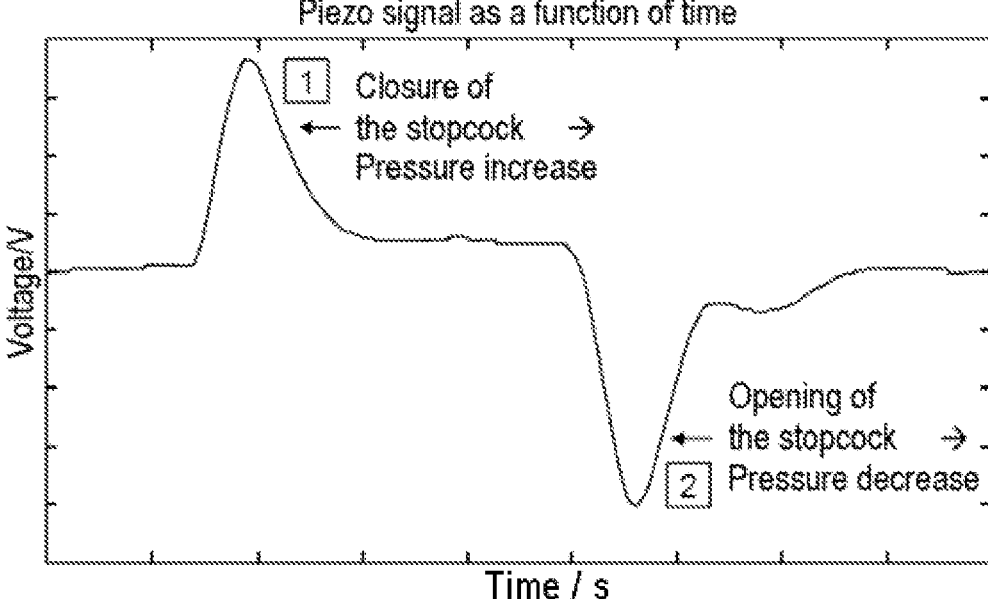
FIG. 4 is an example of a voltage/time diagram to represent the change of the hydraulic pressure when closing a stopcock and when opening a stopcock.

FIG. 4 shows as an example a change of the voltage V measured at the ultrasound transducer 4 as a function of time S when a stopcock is closed so that a pressure increase, that is to say a positive voltage change or voltage increase, occurs at the ultrasound transducer 4, and when the stopcock is subsequently closed, in which case a pressure decrease, that is to say a negative voltage change or voltage reduction, occurs at the ultrasound transducer 4. Such force changes are recorded by using the ultrasound transducer 4 and are used for the adaptive adaptation of the measurement rate. The basis of the measurement effect used is the property of piezoelectric ceramics that they can convert a mechanical stress into an electrical voltage. If a mechanical force acts on the piezoceramic ultrasound transducer 4, in the present case a force change initiated by a flow event, a charge Q that is dependent on the relevant transducer area A and the piezoelectric charge coefficient $d_{33}$ is released. The dependency is as follows:

$$Q(F) = d_{33} \cdot F \qquad (1)$$

The released charge is stored in the internal capacitance $C_0$ of the ultrasound transducer 4 and may be measured in the form of a voltage U:

$$U = \frac{Q(F)}{C_0} = \frac{d_{33} \cdot F}{C_0} \qquad (2)$$

The present invention uses this property since every ultrasonic flow meter already has at least one piezoceramic ultrasound transducer 4. No additional sensors are therefore necessary, so that the method may be implemented economically and efficiently. The ultrasound transducer 4 is positioned near to or directly at the fluid flow in an ultrasonic flow meter 1. This is used by force changes at the piezoceramic platelet of the ultrasound transducer 4 leading to a change of the electrical voltage at the piezoceramic platelet and thus being detectable. For example, the closing of a stopcock may thus be detected by a voltage increase, or the opening of a stopcock may be detected by a voltage reduction according to FIG. 4.

The detected voltage change or voltage U is delivered to an evaluator 14, cf. FIG. 3. By using an amplifier 15, the voltage change or the voltage U is amplified and subsequently filtered by using a filter 16, for example a lowpass filter. Noise signals are thereby filtered out from the voltage change or voltage U. The voltage change or voltage U is subsequently delivered to a comparator 17 which compares it with a reference value. The reference value is stored in a head end 18 and is transmitted from the latter to the comparator 17. Alternatively, the reference value may also be stored directly in the comparator 17. If the voltage change or the voltage U exceeds the reference value, the comparator 17 detects a flow event, which it reports to the head end 18. The head end 18 thereupon adapts the measurement rate of the flow measurement.

Figure 5:
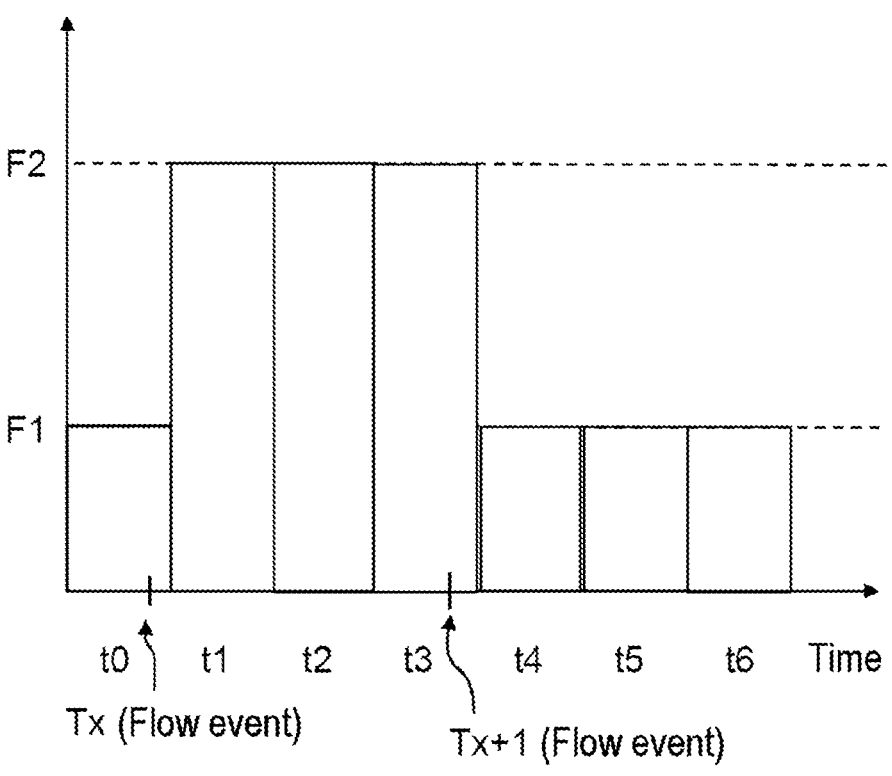
FIG. 5 is a diagram showing a first example of a change of the measurement rate as a function of time.

For example, after the stopcock is opened (for example flow event Tx in FIG. 5), a low measurement rate F1 can be switched here to an increased measurement rate F2. When the stopcock is closed (for example flow event Tx+1), the increased measurement rate F2 may then for example be switched back to the reduced measurement rate F1. The measurement rate F2 means, for example, that three flow measurements instead of one flow measurement (measurement rate F1) are carried out in an otherwise fixed time interval.

Figure 6:
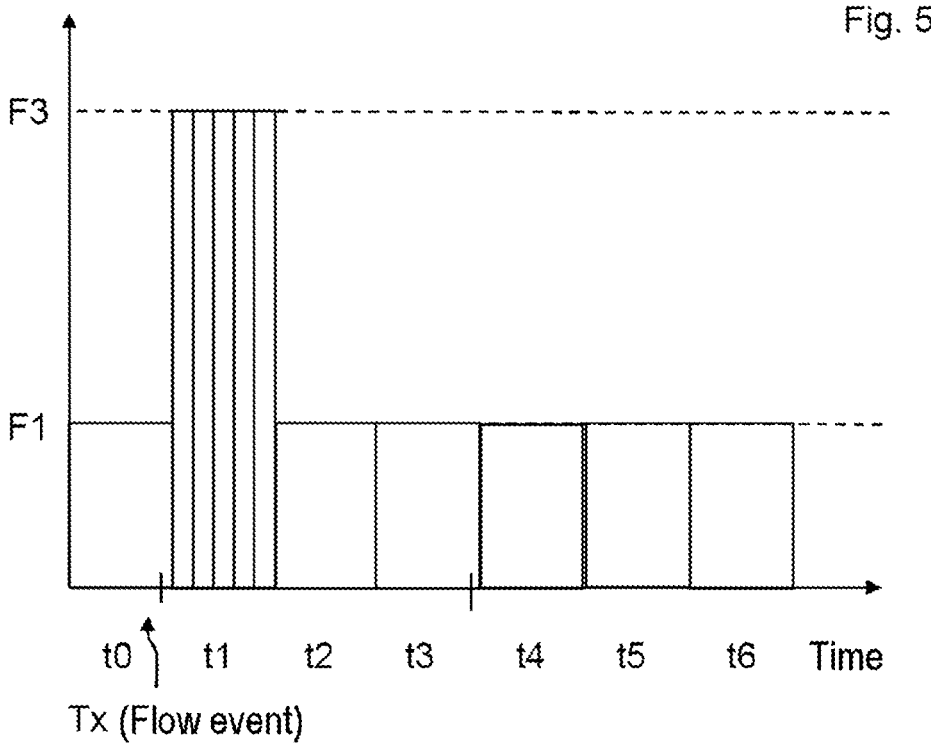
FIG. 6 is a diagram showing a second example of a change of the measurement rate as a function of time.

A third measurement rate F3 may additionally be provided, cf. FIG. 6. In this case, the measurement rate F1 is switched to the measurement rate F3 after the detection of a flow event Tx. Switching from the measurement rate F2 to the measurement rate F3 is also possible after the detection of a flow event (this is not represented in the figures). The measurement rate F3 includes a plurality of measurement bursts, that is to say a plurality of measurements in a time interval which is shorter in comparison with the first measurement rate F1 as well as the second measurement rate F2, for example a time interval in the range of seconds. A flow change may be determined particularly accurately in this way. After a particular or previously established number of measurements have been carried out and/or the previously defined time interval has elapsed, the third measurement rate F3 is switched to the first measurement rate F1. Alternatively, the measurement rate F3 may also be switched to the measurement rate F2.

Figure 7:
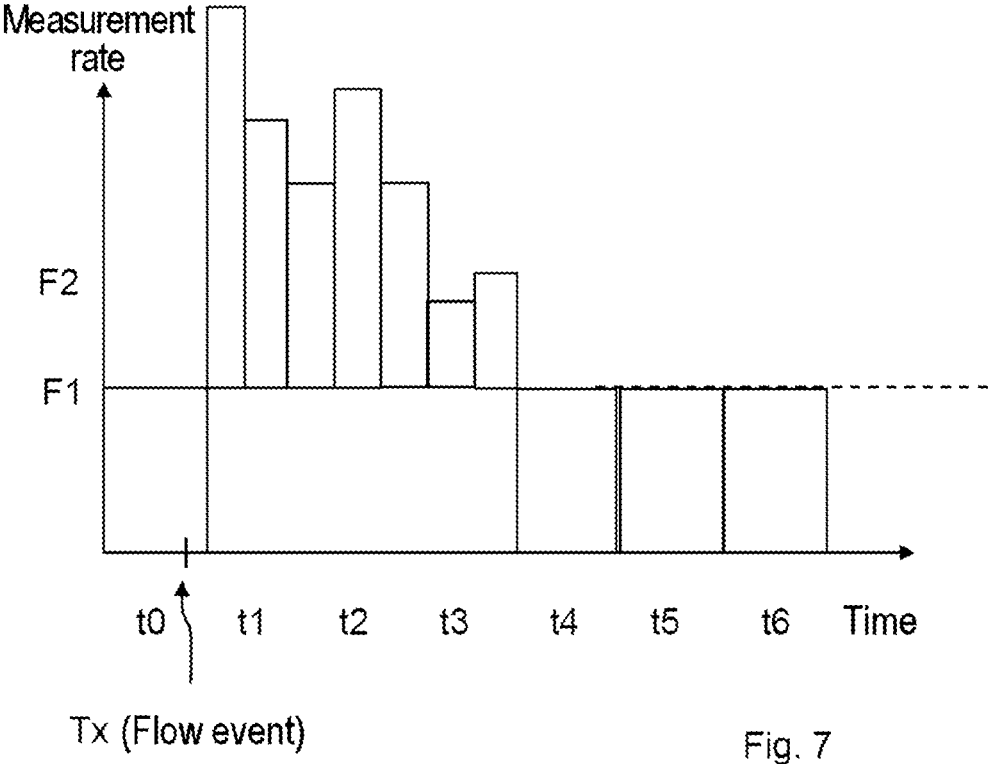
FIG. 7 is a diagram showing a third example of a change of the measurement rate as a function of time.

Alternatively, as schematically represented in FIG. 7, the measurement rate may for example also be adapted algorithmically, in order to adapt the measurement rate to dynamic flow conditions. In this case, for example, the frequency of flow events and/or the instant of flow events and/or their time profile and/or the temporal spacing of preferably neighboring flow events may be used as input variables (data) for an algorithm. The algorithm selected by way of example in FIG. 7 leads to adaptation of the measurement rate over a particular time range. A different algorithm may be used depending on the frequency of the flow events and their time profile. With algorithm-based adaptation of the measurement rate, the time interval of the measurement rate adaptation may for example also be varied. The adaptation of the measurement rate may, as represented in FIG. 7, take place only over a certain length of time (t1-t3).

Figure 8:
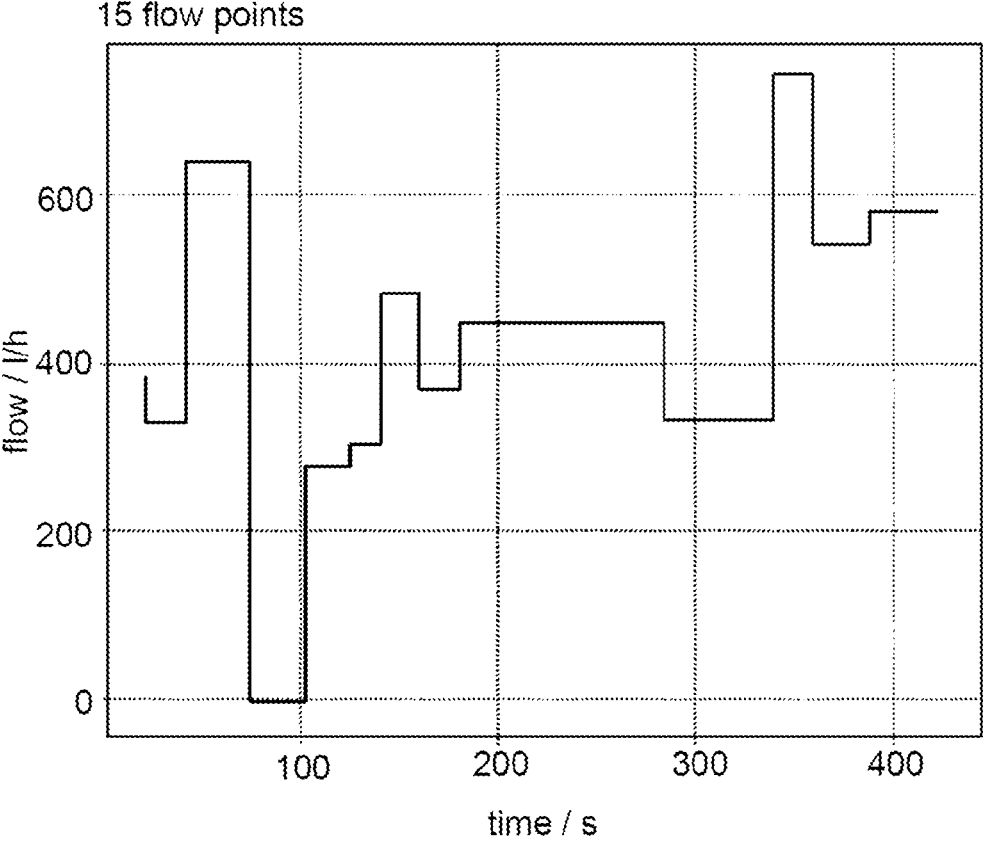
FIG. 8 is a flow/time diagram to represent dynamic flow conditions.

FIG. 8 shows a flow/time diagram in which dynamic flow conditions prevail. This example of the flow/time diagram includes 15 flow points. The present invention makes it possible to represent such dynamic flow conditions significantly more accurately in respect of the flow measurements to be carried out than has previously been possible.

Figure 9:
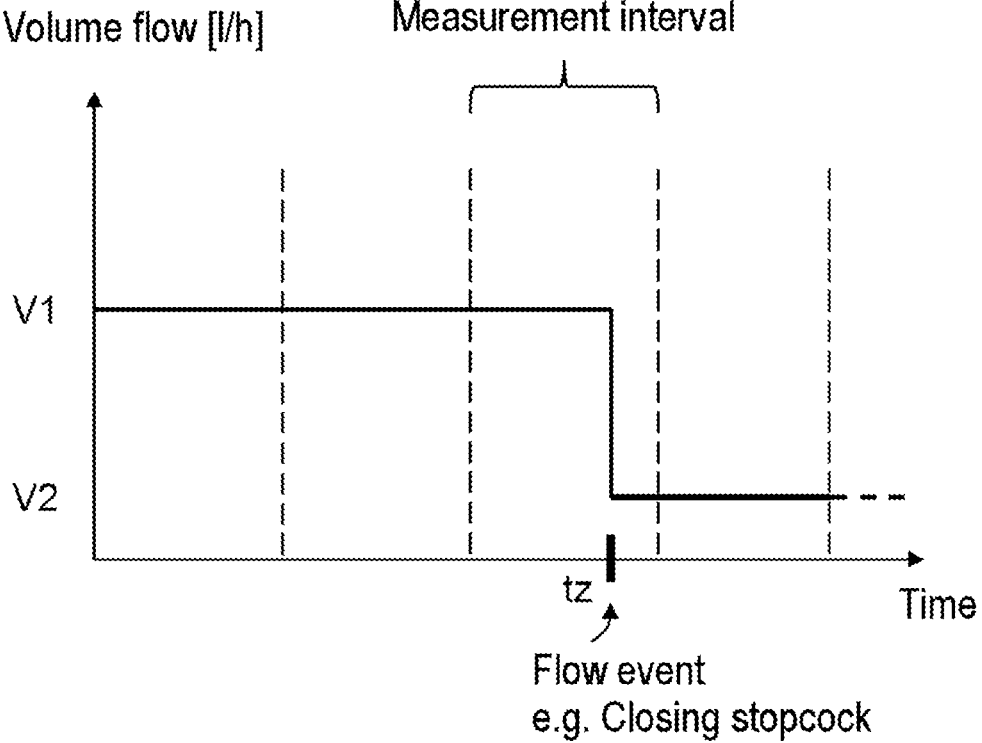
FIG. 9 is a volume flow/time diagram for establishing the flow event in relation to the measurement interval.

Alternatively or in addition, according to the invention the temporal information (instant tz in FIG. 9) about when a flow event has taken place may also be used. The invention makes it possible to detect events which change the flow through the measurement tube, or the measurement tube housing 2. In the case of an ultrasound-based measurement method, the individual flow measurements are performed with a discrete time resolution. With the aid of the invention, a more accurate result of the metered volume may therefore also be determined by temporally classifying the detected events in respect of the measurement interval and interpolating with the aid of this event, as is schematically represented in a simplified way in FIG. 9. A more accurate volume accumulation between two ultrasound measurements may therefore take place despite varying flows. If, for example, the current flow is recorded in a period of time per measurement (for example once per second) and a flow change occurs within this period of time, the time when the flow changed within the period of time may be classified by the present invention. This information may then be used for more precise volume accumulation without having to carry out any additional ultrasound measurement therefor. Only the volume flow V1 and V2 respectively determined before and after the flow change as well as the instant tz of the flow change are required for this.

The invention on the one hand makes it possible to represent dynamic flow conditions significantly more accurately than has previously been possible. On the other hand, the measurement rate may actually be reduced at times of static flow conditions in comparison with previous methods, so that no additional energy demand from the battery is produced. The invention therefore actually makes it possible to save energy by the adaptation of the measurement rate.

Furthermore, more accurate flow recording within a measurement interval may be achieved by recording the flow event accurately in terms of time. The invention therefore represents a very significant contribution to the relevant field.

The following is a summary list of reference numerals and the corresponding structure used in the above description of the invention:

1 Ultrasonic fluid meter
2 Measurement tube housing
3 Fluid line network
4 Ultrasound transducer
5 Reflector
6 Measurement section
7 Electronics module
8 Microprocessor
9 Memory
10 Battery
11 Data interface
12 Display
13 Printed circuit board
14 Evaluator
15 Amplifier
16 Filter
17 Comparator
18 Head end

The invention claimed is:

1. A method for operating an ultrasonic fluid meter or ultrasonic water meter in a fluid line network having a measurement rate including a measurement interval, the method comprising:

using an ultrasound transducer to generate, at particular instants, an ultrasound signal traveling along a measurement section;

using evaluation electronics based on at least one of a time of flight or a time of flight difference of the ultrasound signals to ascertain a flow volume of fluid;

using the ultrasound transducer to detect and using the evaluation electronics to evaluate a hydraulic force or hydraulic force change exerted by a flow event on the ultrasound transducer by the fluid and, as a function thereof at least one of:

adaptively modifying the measurement rate for ascertaining the flow volume of fluid, or correcting the flow volume ascertained over the measurement interval based on a temporal location of the flow event in relation to the measurement interval.

2. The method according to claim 1, which further comprises detecting a hydraulic force or hydraulic force change exerted by the flow event on the ultrasound transducer via the fluid as an electrical voltage occurring at the ultrasound transducer or as an electrical voltage change occurring at the ultrasound transducer.

3. The method according to claim 2, which further comprises establishing a direction of the force change by detecting whether the electrical voltage change occurring at the ultrasound transducer is positive or negative.

4. The method according to claim 2, which further comprises evaluating a voltage profile as a function of time.

5. The method according to claim 3, which further comprises parameterizing the evaluation electronics of the ultrasonic fluid meter as a function of the force change.

6. The method according to claim 3, which further comprises parameterizing the evaluation electronics of the ultrasonic fluid meter as a function of the established direction of the force change.

7. The method according to claim 1, which further comprises using, as the flow event, an actuation of at least one of a stopcock or a valve, or a full or partial closure or full or partial opening of at least one of a stopcock or a valve, or a pump activity.

8. The method according to claim 1, which further comprises storing the hydraulic force or hydraulic force change as a comparative value in the ultrasonic fluid meter or in a head end or assigning the hydraulic force or hydraulic force change as a comparative value to the ultrasonic fluid meter, and comparing the hydraulic force or hydraulic force change as a comparative value by the evaluation electronics with measurement values generated during operation of the ultrasonic fluid meter.

9. The method according to claim 1, which further comprises predefining first and second measurement rates having measurement intervals, the measurement interval for the second measurement rate being greater than for the first measurement rate, and switching from the first to the second measurement rate or vice versa as a function of the detected hydraulic force or hydraulic force change.

10. The method according to claim 9, which further comprises setting the second measurement rate to be greater than the first measurement rate at least by a factor of 2.

11. The method according to claim 9, which further comprises providing a third measurement rate after a detection of a flow event.

12. The method according to claim 11, which further comprises setting the third measurement rate to be higher than at least one of the first measurement rate or the second measurement rate.

13. The method according to claim 11, which further comprises switching to the first measurement rate or to the second measurement rate after the measurements with the third measurement rate as a function of the detected hydraulic force or hydraulic force change.

14. The method according to claim 1, which further comprises adapting the measurement interval algorithmically in a scope of the adaptive modification of the measurement rate for ascertaining the flow volume of fluid.

15. The method according to claim 1, which further comprises recording at least one of:

a frequency of flow events, or an instant of flow events, or a time profile of flow events, or a temporal spacing of flow events or neighboring flow events.

16. The method according to claim 1, which further comprises interpolating the flow volume between measurements.

17. The method according to claim 16, which further comprises carrying out the interpolation as a function of the temporal location of the flow event within the measurement interval.

18. The method according to claim 1, which further comprises jointly taking a remaining residual capacity of a battery of the ultrasonic fluid meter into account when establishing the modification of the measurement rate.

19. The method according to claim 18, which further comprises permitting the ultrasonic fluid meter to still continue to be operated with the modified measurement rate until a rigidly predefined total operating duration.

20. An ultrasonic fluid meter or ultrasonic water meter for installation in a fluid line network, the ultrasonic fluid meter comprising:

a measurement tube housing;

at least one ultrasound transducer for at least one of emitting or receiving an ultrasound signal traveling along a measurement section;

an electronics module containing control and evaluation electronics for controlling an operation and for evaluating a received ultrasound signal;

a battery; and a data interface for data export;

the ultrasonic fluid meter or ultrasonic water meter being operated by the method according to claim 1.

* * * * *